US008225928B2

(12) United States Patent (10) Patent No.: US 8,225,928 B2
Perrier et al. (45) Date of Patent: Jul. 24, 2012

(54) ELECTRONIC DEVICE CASES WITH INTEGRATED CLEANING COMPONENT

(75) Inventors: Carolyn B. Perrier, Newport Beach, CA (US); Dat M. Dang, Westminster, CA (US); Katrina W. Huang, Hacienda Heights, CA (US)

(73) Assignee: Targus Group International, Inc., Anaheim, CA (US)

( * ) Notice: Subject to any disclaimer, the term of this patent is extended or adjusted under 35 U.S.C. 154(b) by 0 days.

(21) Appl. No.: 13/216,027

(22) Filed: Aug. 23, 2011

(65) Prior Publication Data

US 2012/0043231 A1 Feb. 23, 2012

Related U.S. Application Data

(60) Provisional application No. 61/376,192, filed on Aug. 23, 2010.

(51) Int. Cl.
 *B65D 85/00* (2006.01)
(52) U.S. Cl. ........................................ 206/320; 206/305
(58) Field of Classification Search .................. 206/305, 206/320, 349, 363–370, 378, 379, 449–455; 150/154–165; 361/679.55, 679.56
 See application file for complete search history.

(56) References Cited

U.S. PATENT DOCUMENTS

| | | | |
|---|---|---|---|
| 5,217,119 A | 6/1993 | Hollingsworth | |
| 5,363,957 A * | 11/1994 | Reichner | 206/349 |
| 5,524,754 A | 6/1996 | Hollingsworth | |
| 5,555,157 A | 9/1996 | Moller et al. | |
| 5,607,054 A | 3/1997 | Hollingsworth | |
| 6,131,734 A | 10/2000 | Hollingsworth et al. | |
| 6,237,766 B1 | 5/2001 | Hollingsworth | |
| 6,334,533 B1 | 1/2002 | Hollingsworth et al. | |
| 6,334,534 B1 | 1/2002 | Hollingsworth et al. | |
| 6,535,199 B1 | 3/2003 | Canova, Jr. et al. | |

(Continued)

FOREIGN PATENT DOCUMENTS

JP 11299521 A 11/1999

(Continued)

OTHER PUBLICATIONS

International Search Report and Written Opinion for PCT/US2011/039429 filed Jun. 7, 2011, and mailed Feb. 28, 2012, 9 pgs.

*Primary Examiner* — Bryon Gehman
(74) *Attorney, Agent, or Firm* — John R. Thompson; Stoel Rives LLP

(57) ABSTRACT

Cases for electronic devices, such as an iPad, are disclosed. The cases include an integrated cleaning component configured to wipe one or more surfaces of an electronic device. In some embodiments, the integrated cleaning component is configured to automatically wipe the surface(s) of the electronic device as it is inserted into or removed from the case. The integrated cleaning component of some embodiments include strips of material configured to engage the surface of the electronic device as it is inserted and/or removed from the case and to wipe or scrub away foreign material. The cleaning component can include various different materials to target primary removal of a particular foreign material (e.g., fingerprints, dirt, dust, oils, etc.). Other embodiments provide integrated storage of the integrated cleaning component, which can easily be removed by a user to wipe the surface(s) of the electronic device.

22 Claims, 5 Drawing Sheets

U.S. PATENT DOCUMENTS

| | | |
|---|---|---|
| D476,149 S | 6/2003 | Andre et al. |
| 6,746,638 B1 | 6/2004 | Zadesky et al. |
| D500,923 S | 1/2005 | Gonzalez et al. |
| D527,176 S | 8/2006 | Andre et al. |
| D533,348 S | 12/2006 | Andre et al. |
| D541,646 S | 5/2007 | Hayes et al. |
| D574,375 S | 8/2008 | Prest et al. |
| D574,819 S | 8/2008 | Andre et al. |
| D582,405 S | 12/2008 | Andre et al. |
| 7,467,695 B2 | 12/2008 | Gormick et al. |
| 7,503,440 B2 | 3/2009 | Gormick et al. |
| 7,747,007 B2 | 6/2010 | Hyun et al. |
| D623,404 S | 9/2010 | Andre et al. |
| D623,638 S | 9/2010 | Richardson et al. |
| D623,639 S | 9/2010 | Richardson et al. |
| 7,876,550 B1 | 1/2011 | Albertini et al. |
| 2001/0014010 A1 | 8/2001 | Jenks et al. |
| 2003/0186729 A1 | 10/2003 | Engstrom et al. |
| 2004/0018863 A1 | 1/2004 | Engstrom et al. |
| 2007/0279855 A1 | 12/2007 | Linsmeier et al. |
| 2009/0194444 A1* | 8/2009 | Jones ............................ 206/320 |
| 2010/0082445 A1 | 4/2010 | Hodge et al. |
| 2010/0258602 A1 | 10/2010 | Amin |
| 2011/0034221 A1 | 2/2011 | Hung et al. |
| 2011/0090626 A1 | 4/2011 | Hoellwarth et al. |

FOREIGN PATENT DOCUMENTS

| | | |
|---|---|---|
| JP | 2000217622 A | 8/2000 |
| JP | 2004231158 A | 8/2004 |
| KR | 200362369 Y1 | 9/2004 |

* cited by examiner

ELECTRONIC DEVICE CASES WITH INTEGRATED CLEANING COMPONENT

RELATED APPLICATIONS

This application claims priority under 35 U.S.C. §119(e) to U.S. Provisional Patent Application No. 61/376,192, filed Aug. 23, 2010, and entitled "ELECTRONIC DEVICE CASES WITH INTEGRATED CLEANING COMPONENT," which is herein incorporated by reference in its entirety.

TECHNICAL FIELD

The present disclosure relates generally to cases for portable electronic devices, and more particularly to cases with an integrated cleaning component to clean the electronic device.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION OF PREFERRED EMBODIMENTS

Figure 1:
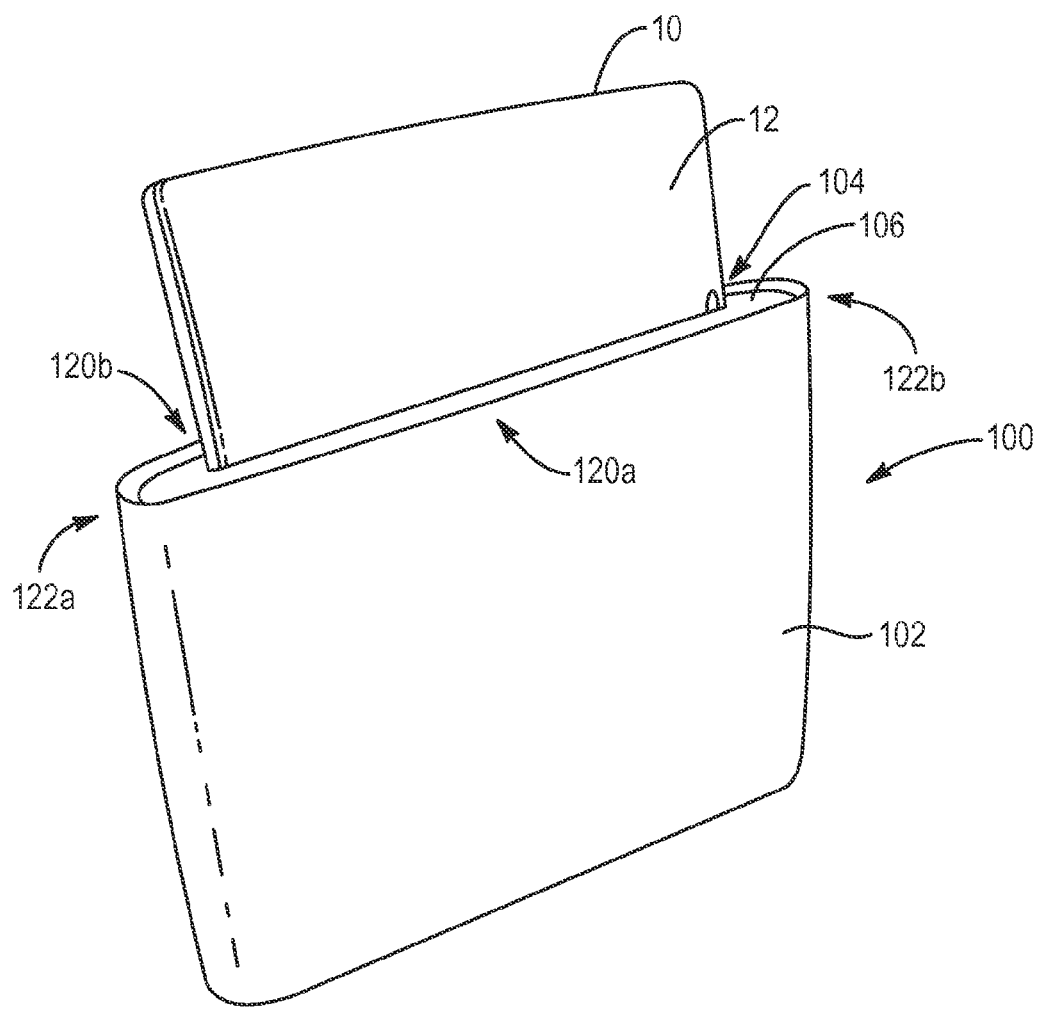
FIG. 1 illustrates an electronic device case having an integrated cleaning component, according to one embodiment of the present disclosure.

Touch-screen technology is flooding the consumer electronics industry, and has become particularly prevalent in handheld electronic devices and tablet computers. The touch-screen and other surfaces of the an electronic device can become dirty during handling and/or use, such as with dirt, dust, fingerprints and smudges. Some embodiments of the present disclosure provide electronic device cases that have an integrated cleaning component constructed and arranged to wipe the surfaces of the electronic device. In some embodiments, the cleaning component may be configured to automatically wipe one or more surfaces of the electronic device as the device is inserted into the case or removed from the case. Alternatively, the cleaning component may be stored in a manner integrated with the case for removal by a user to clean the electronic device.

Embodiments may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description is not intended to limit the scope of the disclosure, but is merely representative of possible embodiments of the disclosure. In some cases, well-known structures, materials, or operations are not shown or described in detail.

Figure 2:
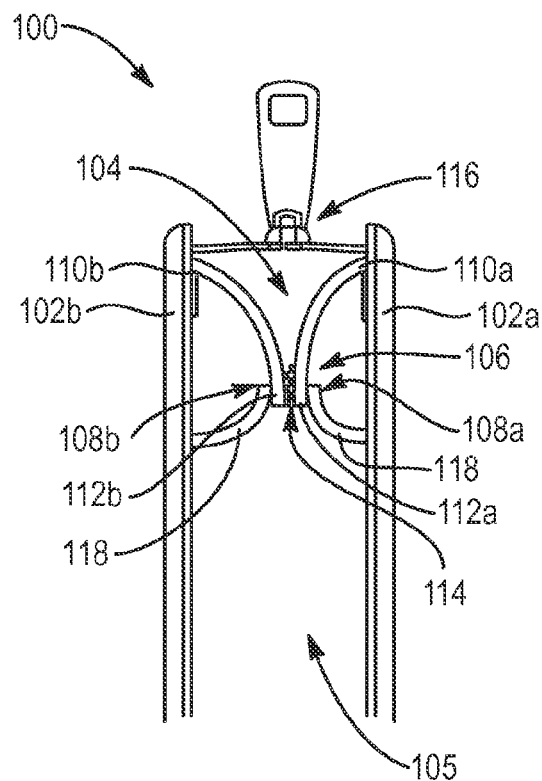
FIG. 2 is a cross-sectional view of the case of FIG. 1.

FIG. 1 illustrates an electronic device case 100 having an integrated cleaning component, according to one embodiment of the present disclosure. FIG. 2 is a cross-sectional view of the case 100 of FIG. 1. The term "case" as used herein does not necessarily imply an encasing or retaining functionality, although some embodiments of the case 100 may have such functionalities. The case 100 can be configured to receive an electronic device 10, and may further function to retain, carry, and protect an electronic device 10. The term "electronic device" is a broad term that is used herein in its ordinary sense and includes such devices as tablet personal computers (e.g., the Apple® iPad™), smart phones (e.g., the Apple® iPhone®, the Motorola® Droid®, the BlackBerry® Storm™), and electronic book readers (e.g., the Amazon® Kindle™, the Barnes & Nobel Nook™). In the illustrated embodiment, the electronic device 10 is an iPad. An ordinarily skilled artisan appreciates the disclosed embodiments are not limited to use with an iPad, but may be configured for another electronic device.

The case 100 according to the illustrated embodiment can comprise a cover 102 having an opening 104 through which the iPad 10 can be inserted into a cavity 105 (or interior space) of the case 100, as shown in FIG. 2. The cover 102 can have a first panel 102a and a second panel 102b. The first panel 102a can be configured to span and at least partially cover one of a front or a back of the iPad 10. The first panel 102a may form a first side 120a of the opening 104 and may extend from a first end 122a of the opening 104 to a second end 122b of the opening 104. The second panel 102b can also be configured to span and at least partially cover the other of the front or the back of the iPad 10. The second panel 102b may form a second side 120b of the opening 104 and may extend from the first end 122a of the opening 104 to the second end 122b of the opening 104. The first panel 102a and second panel 102b can be constructed and arranged to provide rigid even pressure to the iPad 10 when it is inserted into the case 100.

In the illustrated embodiment, the first panel 102a and the second panel 102b may be coupled together, or otherwise joined, along three edges, as illustrated, to create a sleeve-like enclosure to encase an iPad 10 or other electronic device. Alternatively, the cover 102 may comprise additional panels to join the first panel 102a and second panel 102b along one or more edges. The first panel 102a and second panel 102b are not joined, or are releasably joined (such as with a zipper 116 as illustrated, hooks and loops, buttons, or other releasable securement mechanism), along one edge, so as to form the opening 104. Accordingly, the cover 102 can function substantially similar to a sleeve or envelope to receive and substantially encase the iPad 10. As will be appreciated, in another embodiment, the cover may form a sleeve-like structure to slide over the case without enclosing or encasing the iPad 10.

The case 100 can include an integrated cleaning component 106 constructed and arranged to wipe one or more surfaces of the iPad 10. For example, the cleaning component 106 can be configured to wipe a touch-screen display 12 of the iPad 10 (e.g., a front surface) as the iPad 10 is inserted into and removed from the case 100. In the illustrated embodiment, the cleaning component 106 may be positioned proximate to and/or around the interior edge of the opening 104 of the case 100, so as to wipe both the front and back surfaces of the iPad 10 as it is inserted into and/or removed from the case 100. For example, the cleaning component 106 may be positioned on the interior surface of the first panel 102a on the first side 120a of the opening 104 and extend from a point proximate the first end 122a of the opening 104 to a point proximate the second end 122b of the opening 104. The cleaning component 106 may also be positioned on the interior surface of the second panel 102b on the second side 120b of the opening 104 and extend from a point proximate the first end 122a of the opening 104 to a point proximate the second end 122b of the opening 104. Because the cleaning component 106 is disposed on the first side 120a of the opening 104 and the second side 120b of the opening, both a front surface and back surface of the iPad 10 are cleaned as the iPad 10 is inserted and/or removed from the case 100.

Alternatively, the cleaning component 106 may be positioned on only one of the sides 120a, 120b of the opening 104, such as for example on either the first side 120a formed by the first panel 102a of the cover 102 or on the second side 120b formed by the second panel 102b of the cover 102. The cleaning component 106 may extend from a point proximate the first end 122a of the opening 104 to a point proximate the second end 122b of the opening 104. In this configuration, only one surface of the iPad 10 may be wiped each time it is inserted into and removed from the case 100.

An ordinarily skilled artisan understands that in alternative embodiments the cleaning component may be attached to another internal component of the case 100, rather than the interior surface of the panels 102a, 102b.

Figure 2A:
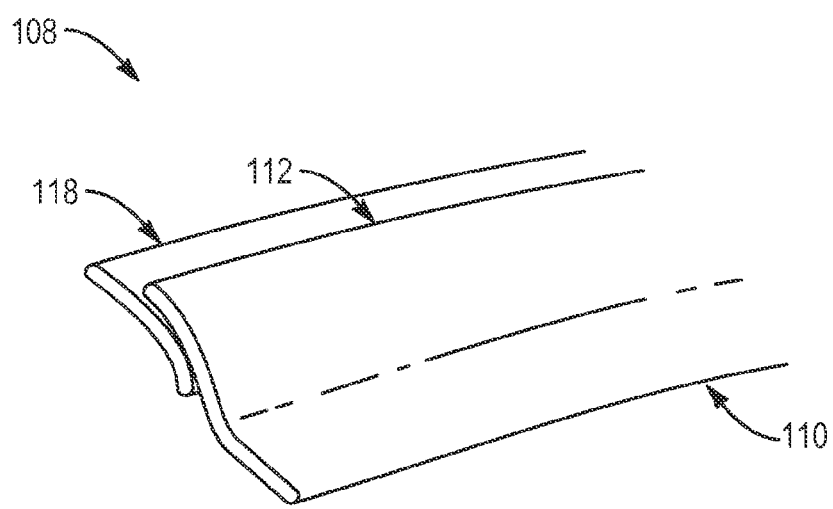
FIG. 2A illustrates one embodiment of a cleaning component usable in connection with the case of FIG. 1.

As best illustrated in FIG. 2, the cleaning component 106 may comprise one or more flaps 108a, 108b. Flaps 108a and 108b may comprise rubber, felt, plastic, or any other suitable material configured to wipe and/or clean a surface of an electronic device such as the iPad 10. The flaps 108 may comprise rubber strips as shown in FIG. 2A. Alternatively, in other embodiments, the flaps 108 may comprise another similar material suitable for cleaning a screen or another surface of an electronic device. In some embodiments, the flaps 108 may be coated or lined with another material or substance to enhance the cleaning properties of the cleaning component.

In the illustrated embodiment, two elongate flaps 108a, 108b (collectively, or generally 108) line both sides 120a, 120b (collectively, or generally 120) of the opening 104 of the case 100. One flap 108a, 108b may be positioned on each side 120 of the opening 104 (i.e., a first flap 108a coupled to the first panel 102a of the cover 102 and a second flap 108b coupled to the second panel 102b of the cover 102). The flaps may extend from a first side of the opening 104 to a second side of the opening. A first side 110a, 110b (collectively 110) of the flaps 108 may be secured to the interior of the cover 102 and a second side 112a, 112b (collectively 112) may extend toward the interior of the case 100. Specifically, the first side 110a of the first flap 108a may be secured to the inside of the first panel 102a of the cover 102 along the first side 120a of the opening 104 and the second side 112a of the first flap 108a may protrude into the opening 104 and/or the cavity 105 toward the inside of the second panel 102b. Similarly, the first side 110b of the second flap 108b may be secured to the inside of the second panel 102b of the cover 102 along the second side 120b of the opening 104 and the second side 112b of the second flap 108b may extend into the opening 104 and/or the cavity 105 toward the inside of the first panel 102a.

The second sides 112 of the flaps 108 may be biased towards one another and/or to abut together, or otherwise be configured so as to be positioned to wipe opposing surfaces (e.g., front surface and back surface) of an iPad 10 as it is inserted into the case 10. Because the first and second panels 102a, 102b of the cover provide rigid even pressure across the surface of the iPad 10, the flaps 108 also provide even pressure across the width (or alternatively the length) of the surface of the iPad 10. In the illustrated embodiment, each of the flaps 108 is curved (or bent) to substantially form an arc (e.g., a quarter circle), such that the first sides 110 of the flaps 108 are secured to be positioned substantially in a plane and the second sides 112 of the flaps 108 are positioned abutting one another and aligned in parallel with a second plane that is parallel to the front and back surfaces of the iPad 10. In the illustrated embodiment, the first plane may be approximately perpendicular to the second plane. The curved (or bent) configuration may enable the second sides 112 of the flaps 108 to be biased substantially towards one another. The biasing of the flaps 108 can cause the second sides 112 of the flaps to press against or otherwise exert a force against a surface of an iPad 10 or other electronic device as it is inserted into the case 100. The flaps 108 pressing against the surface can remove dirt, dust, fingerprints, debris, and other foreign materials from the surface of the iPad 10 as it is inserted into and/or removed from the case 100.

The flaps 108 may further comprise microteeth 114 to scrub the surface of the electronic device 10. In the illustrated embodiment, the microteeth 114 may be positioned on the flaps 108 at a position proximate the second sides 112 of the flaps 108 where the first flap 108a and the second flap 108b abut together. As can be appreciated, the positioning of the microteeth 114 can be closer toward the first (secured) side 110 of the flap and away from the other flap 108 depending on the size of the opening 104 and the size of the thickness of an electronic device intended to be inserted into the case 100. The microteeth 114 may be configured to drag or rub along the surface of the iPad 10 and remove dirt, dust, fingerprints, debris, and other foreign materials from the surface of the iPad 10 as it is inserted into and removed from the case 100.

The flaps 108 may further comprise one or more securement portions 118 that, in some embodiments, may be configured to prevent the second sides 112 of the flaps 108 from being pulled out of the cavity 105. Friction between a surface of the iPad 10 and the flaps 108 may result in the flaps 108 being pulled out through the opening as the iPad 10 is removed from the case, thereby reversing direction (e.g., curvature) of the flaps. Reversing the direction of the flaps results in the microteeth 114 disposed on the upper surface facing away from a surface of the iPad 10. In the illustrated embodiment, for example, the securement portion 118 of the flaps 108 may comprise a strip of material. The strip of material may be the same material as the flaps 108 (e.g., a continuation of the flaps 108). The securement portion 118 may curve back toward the respective first and second panels 102a, 102b of the cover 102 to couple the second sides 112 of the flaps 108 to the interior surface of the cover 102 and thereby limit the second sides 112 of the flaps 108 from being pulled out through the opening 104. For example, a first securement portion 118a may secure the second side 112a of the first flap 108a and a second securement portion 118b may secure the second side 112b of the second flap 108b.

In one embodiment, the securement portion(s) 118 may be secured to the panel 102a, 102b, thereby configuring the flaps 108 in a "C" shape (or mirror image thereof) with both the first sides 110 and the second sides 112 secured to a panel 102a, 102b. In another embodiment, the securement portion(s) may extend to and be secured to the bottom of the cavity 105. With the securement portion 118 of the rubber flaps 108 secured to the inside of the cover 102, the cleaning component 106 cannot be turned inside-out (i.e., with second sides 112a, 112b of the flaps 108 positioned facing out of the cavity 105 and the microteeth 114 facing away from and not abutting against an iPad 10) when the iPad 10 is removed from the case. In still another embodiment, the rubber flaps 108 do not comprise a securement portion, but are sufficiently rigid to withstand a pulling force created by friction of the surface (e.g. upper surface) of the flap against the smooth surface of the iPad and by the removal of the iPad 10 from the case 100. In still other embodiments, the securement portion(s) need not be connected to the interior of the case at all, and may comprise a component coupled only to the flaps.

An ordinarily skilled artisan appreciates the case 100 is not limited to use with the iPad 10, but may be configured for another electronic device.

Figure 3:
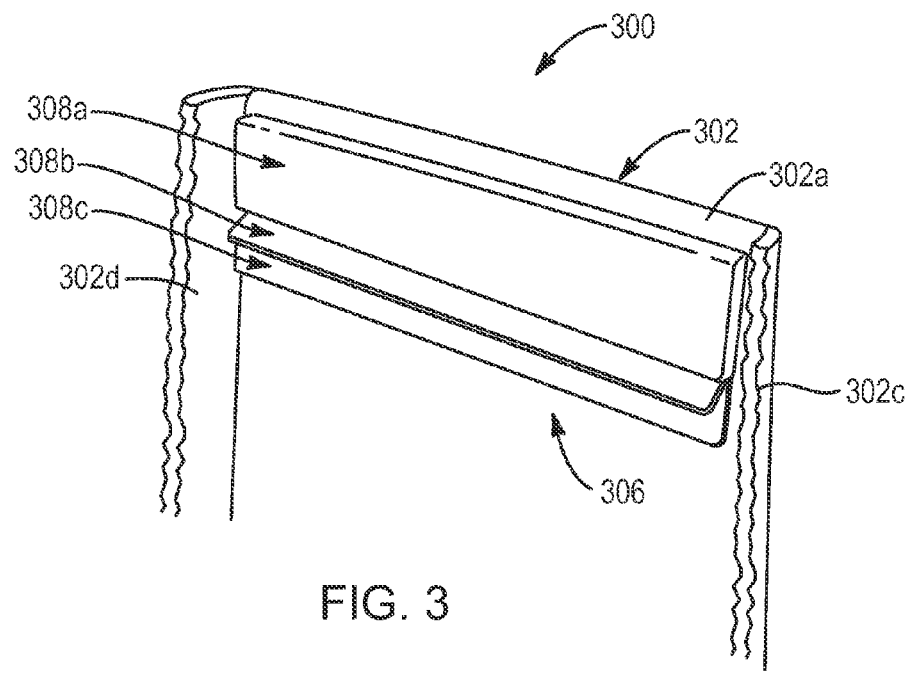
FIG. 3 illustrates a perspective cutaway view of an electronic device case having an integrated cleaning component, according to another embodiment of the present disclosure.
Figure 4:
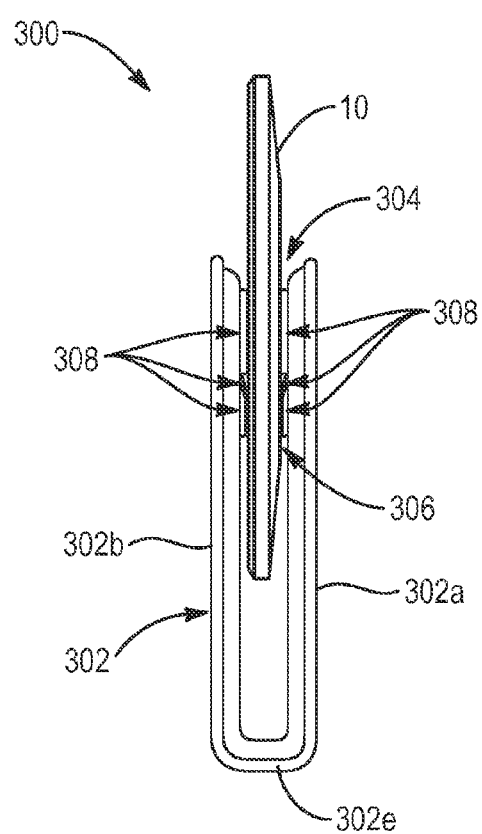
FIG. 4 illustrates a cross-sectional view of the case of FIG. 3.

FIG. 3 illustrates a perspective cutaway view 300 of an electronic device case 300 having an alternative integrated cleaning component 306, according to another embodiment of the present disclosure. FIG. 4 is a cross-sectional view of the case 300 of FIG. 3. The case 300 can be configured to receive an iPad 10, and may further function to retain, carry, and protect the iPad 10, similar to the case 100 of FIG. 1. The case 300 can comprise a cover 302 having an opening 304 through which the iPad 10 or other electronic device can be inserted into the case 300. The cover 302 can be formed of a plurality of panels 302a, 302b, 302c, 302d, 302e. The first panel 302a can be configured to span and substantially cover one of the front or the back of the iPad 10. The first panel 302a may form a first side 320a of the opening 304 an may extend from a first end 322a of the opening 304 to a second end 322b of the opening. The second panel 302b can also be configured to span and substantially cover the other of the front or back of the iPad 10. The second panel 302b may form a second side 320b of the opening 304 and may extend from the first end 322a of the opening 304 to the second end 322b of the opening 304. The first panel 302a and second panel 302b may be joined together along one or more edges by additional panels 302c, 302d, 302e. The first panel 302a and second panel 302b can be configured to provide even constant pressure along a length (or alternatively a width) of an iPad 10 as it is inserted into and removed from the case 300.

The case 300 can include an integrated cleaning component 306 configured to wipe one or more surfaces of the iPad 10 as it is inserted into the case 300. In the illustrated embodiment, the cleaning component 306 may include a plurality (e.g., three) individual wipers 308a, 308b, 308c positioned proximate to and/or around the interior edge of the opening 304 of the case 300, so as to wipe both the front and back surfaces of the iPad 10 as it is inserted into and/or removed from the case 300. For example, the cleaning component 306 may be positioned on the interior surface of the first panel 302a on the first side 320a of the opening 304 and extend from a point proximate the first end 322a of the opening 304 to a point proximate the second end 322b of the opening 104. The cleaning component 306 may also be positioned on the interior surface of the second panel 302b on the second side 320b of the opening 304 and extend from a point proximate the first end 322a of the opening 304 to a point proximate the second end 322b of the opening 304. Because the cleaning component 306 is disposed on the first side 320a of the opening 304 and the second side 320b of the opening, both a front surface and back surface of the iPad 10 are cleaned as the iPad 10 is inserted and/or removed from the case 300.

Alternatively, the cleaning component 306 may be positioned on only one of the sides 320a, 320b of the opening 304, for example on either the first side 320a formed by the first panel 302a of the cover 302 or the second side 320b formed by the second panel 302b of the cover 302. The cleaning component 306 may extend from a point proximate a first end 322a of the opening 304 to a point proximate a second end 322b of the opening. The construction of the first panel 302a and second panel 302b, which may be configured to provide a constant and even pressure, can ensure that the cleaning component 306 is applied evenly across the entire length (or alternatively the width) of the iPad 10 as it is inserted into or removed from the case 300.

The wipers 308 of the integrated cleaning component 306 may each be formed of a different material and/or otherwise configured to more effectively remove a different foreign material. In this manner, multiple wipers 308 collectively can more effectively remove a plurality of foreign materials from the surface of the iPad 10. For example, the first wiper 308a may be formed of a first material (e.g., leather) and configured to scrub primarily a first type of foreign material from a surface of the iPad 10, the second wiper 308b may be formed of a second material (e.g., rubber) and configured to scrub primarily a second type of foreign material from a surface of the iPad, 10, and the third wiper 308c may be formed of a third material (e.g., foam) and configured to scrub primarily a second type of foreign material from a surface of the iPad 10. As can be appreciated, a varying number of wipers 308 formed of a variety of different materials can be provided to more effectively remove a greater number of foreign materials from the surface(s) of the iPad 10, or otherwise more effectively clean the surface(s) of the iPad 10. As can also be appreciated, each of the plurality of wipers 308 may be configured with a different surface texture and/or pattern to further facilitate primarily removing a particular type of foreign material from a surface of the iPad 10.

The wipers 308 in some embodiments may be dry. However, in some embodiments, one or more of the wipers 308 may be configured to absorb or otherwise include a liquid, such as a cleaning solution, to dispense to enhance scrubbing of a surface of the iPad 10. In some embodiments, the one or more wipers 308 may be configured to automatically release the liquid while an electronic device is inserted. In other embodiments, a trigger or other manual mechanism may be used to release the liquid at a user's discretion.

An ordinarily skilled artisan appreciates the case 300 is not limited to use with the iPad 10, but may be configured for another electronic device.

Figure 5:
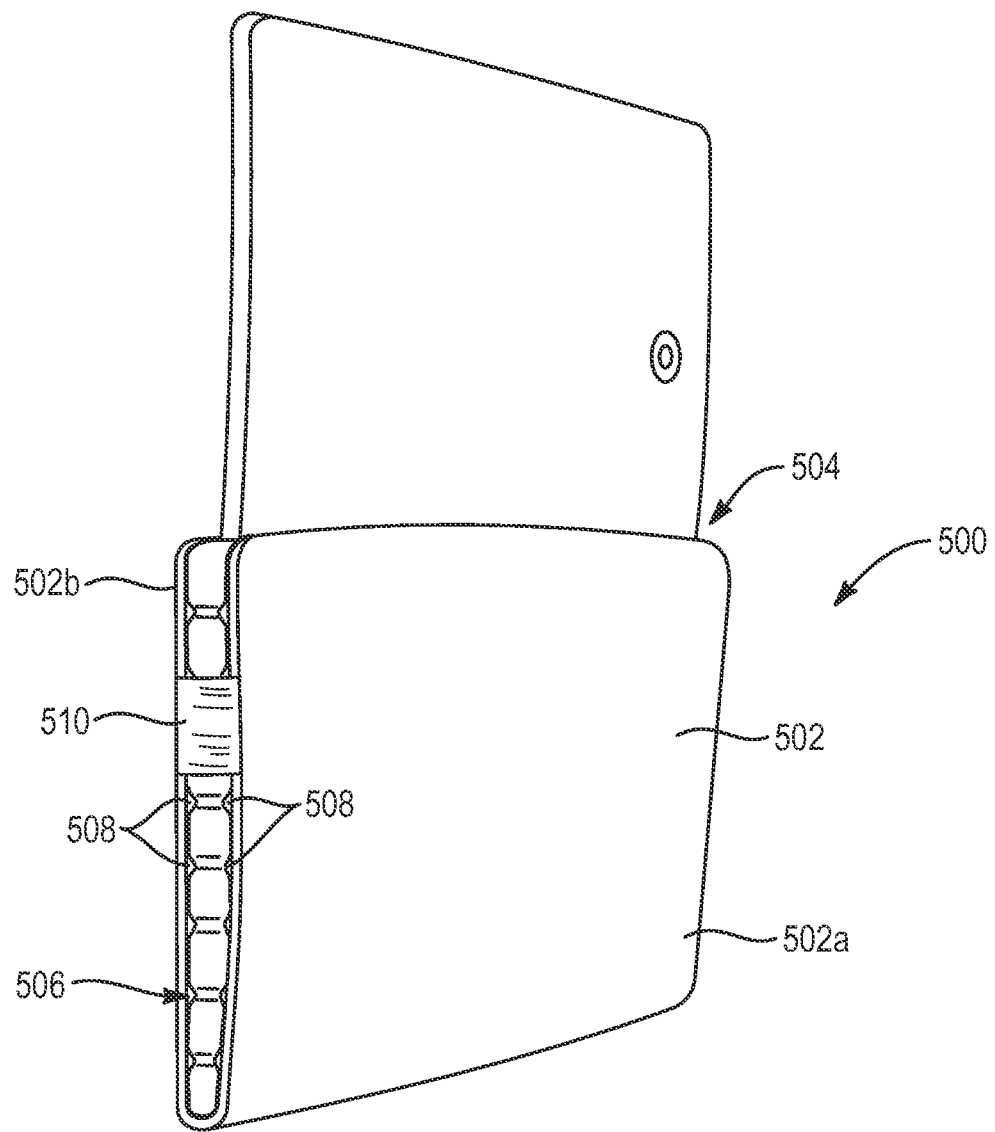
FIG. 5 illustrates an electronic device case having an integrated cleaning component, according to another embodiment of the present disclosure.

FIG. 5 illustrates an electronic device case 500 having an integrated cleaning component 506, according to another embodiment of the present disclosure. The case 500 can include a cover 502 and a cleaning component 506 integrated into the cover 502. In the illustrated embodiment, the cover 502 comprises a front panel 502a and a back panel 502b joined together by a joining component 510. The joining component 510 may be configured to bias the front panel 502a toward the back panel 502b (and vice versa) so that the panels 502a, 502b can provide a constant even pressure against an iPad 10 as it is inserted into, or removed from, the case 500. For example, the joining component 510 may be an elastic strip coupled to the front panel 502a and to the back panel 502b of the cover 502 substantially near the opening 504 of the case. The joining component 510 may form a portion of an edge of the case, leaving a portion of the iPad 10 exposed while inside the case 500, and also securing the iPad 10 from sliding out the side of the case. In another embodiment, the joining component 510 may form an entire edge of the case 500, such that no portion of the iPad 10 is exposed when inside the case 500.

In the illustrated embodiment, the cleaning component 506 may include a plurality of ribs 508 positioned from the top (where the opening 504 is positioned) to the bottom of the interior of the case 500. Of course, in other embodiments, the ribs 508 may only be positioned near the top of the case. The ribs 508 may be formed of rubber or other rigid material suitable for wiping a surface of an iPad 10 or other electronic device. The ribs 508 may be configured to wipe the surface of the iPad 10 as it is inserted into or removed from the case 500. The vertical positioning of the ribs 508 may provide for simultaneous wiping of multiple portions of the surface of the iPad 10 to enable more effective cleaning of the surface of the iPad 10.

Figure 6:
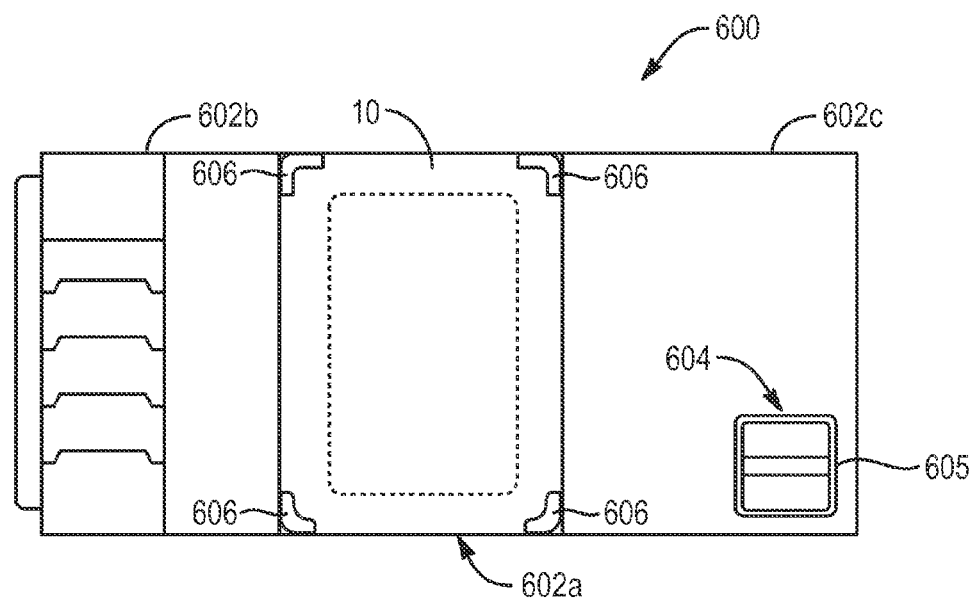
FIG. 6 illustrates an electronic device case having an integrated cleaning component, according to another embodiment of the present disclosure.

FIG. 6 illustrates an electronic device case 600 having an integrated cleaning component 604, according to another embodiment of the present disclosure. The case 600 may comprise a tri-fold, portfolio-type cover 602 formed by three panels 602a, 602b, 602c. A base panel 602a may abut the back of an iPad 10 inserted into the case 600. The base panel 602a may include a plurality of clips 606 to secure the iPad 10 in place. A first side panel 602b may be joined to the base panel 602a along a first side of the base panel 602a. The first side panel 602b may be configured to fold over the top of the iPad 10 when inserted into the case 600, thereby covering the touch-screen of the iPad 10. As illustrated, the first side panel 602b may comprise a card holder into which business cards, credit cards, or the like may be inserted. In another embodiment, the first side panel 602b may include storage for a pad of paper, a writing instrument, and/or other office materials. A second side panel 602c may be joined to the base panel 602a along a second side of the base panel, opposite the first side panel 602b. The second side panel 602c may be configured to fold over the top of both the first side panel 602b (when folded over the base panel 602a) and over the top of an iPad 10 inserted into the base panel 602a.

An integrated cleaning component 604 may be integrated into one of the panels 602a, 602b, 602c (e.g., the second side panel 602c). The integrated cleaning component 604 may comprise a pad configured for a user to grasp and wipe a surface of an iPad 10 or other electronic device. In the illustrated embodiment, the cleaning component 604 is recessed into a cavity 605 of the second side panel 602c. The cavity 605 and/or the second flap may be configured such that the cleaning component 604 may be secured in a recessed position in the cavity 605 by a friction fit. As can be appreciated, in another embodiment, the cleaning component 604 may be secured in the recessed position by a securement device, such as hooks and loops, clips, buttons, and other securement devices.

Figures 6A, 6B:
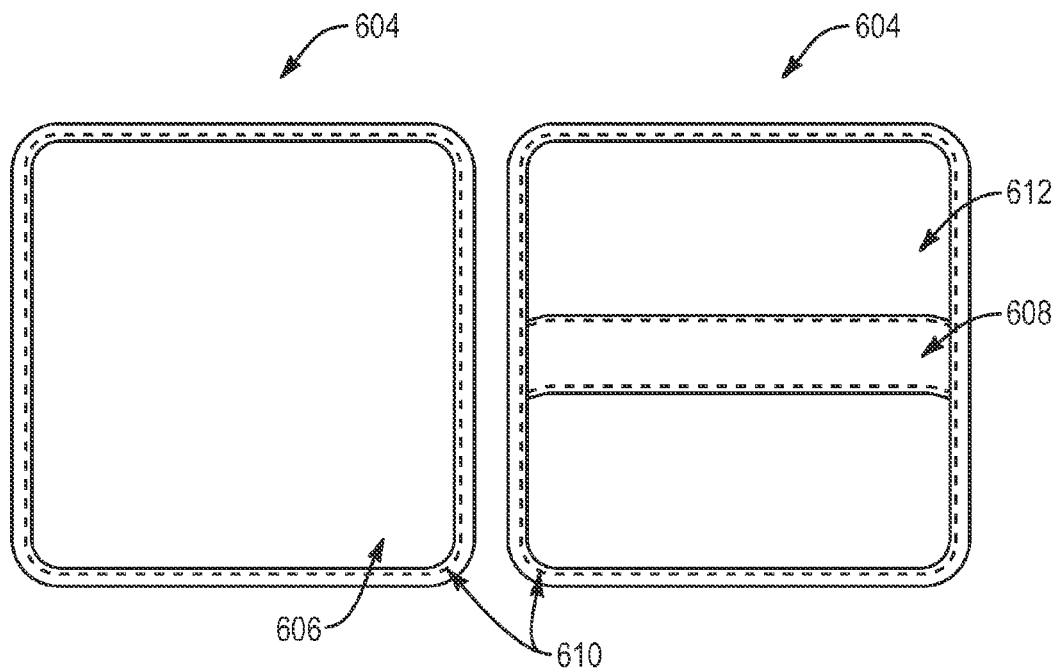
FIGS. 6A and 6B illustrate a bottom surface and a top surface, respectively, of a cleaning component, according to another embodiment of the present disclosure.

FIGS. 6A and 6B illustrate a bottom surface 606 and a top surface 612 of a cleaning component 604 usable with case 600 or another similar case. The bottom surface 606 of the cleaning component 604 may comprise an acer cleaning cloth, a felt material, or other material suitable for cleaning the screen of an electronic device. The cloth may be secured to a backing using a binding 610. The top surface 612 of the cleaning component 604 may comprise a handle 608, which may allow a user to grasp the cleaning component 604. The handle 608 may comprise a strap, as illustrated, which can be positioned flush with the top surface 612 of the cleaning component 604 and also flush with the surface of the second side panel 602c. Similarly, the handle 608 may allow a user to easily remove the cleaning component 604 from the cavity 605 of the second side panel 602c of the case 600. A user may simply pull on the handle 608 and overcome the friction fit, or another securement feature, to thereby remove the cleaning component 604 from the cavity 605. The user may then use the handle 608 to grasp the cleaning component 604, or otherwise secure the cleaning component 604 relative to the user's fingers, and proceed to wipe the iPad 10 or other electronic device using the cleaning material on the bottom surface 606 of the cleaning component 604. The user may then use the handle 608 to reposition the cleaning component 604 in the cavity 605 and to push the cleaning component 604 back into a recessed position for storage and later use.

Those having ordinary skill in the art appreciate and understand that many changes may be made to the details of the above-described embodiments without departing from the underlying principles disclosed herein. Any suitable combination of various embodiments, or the features thereof, is contemplated.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment. Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects may lie in a combination of fewer than all features of any single foregoing disclosed embodiment.

We claim:

1. A case for an electronic device comprising:
 a cover that defines an opening through which the electronic device can be inserted into the case, the cover having a first panel and a second panel, the first panel configured to span and at least partially cover a front surface of the electronic device and form a first side of the opening, the second panel configured to span and at least partially cover a back surface of the electronic device and form a second side of the opening, wherein the opening is elongate to accommodate a width or length of the electronic device and narrow to conform to a thickness of the electronic device; and
 a cleaning component positioned inside the cover proximate the opening of the cover, the cleaning component configured to engage a surface of the electronic device and wipe the surface as the electronic device is inserted into the case through the opening, the cleaning component comprising:
  a first flap secured to an interior surface of the cover and extending along the first side of the opening from a point proximate a first end of the opening to a point proximate a second end of the opening, the first flap having a first side secured to the interior surface of the first panel of the cover and a second side extending away from the first panel of the cover, toward a center of the opening, and toward the second panel and the second side of the opening, the second end of the first flap configured to wipe one of the front surface and the back surface of the electronic device;
  a first plurality of microteeth disposed on the first flap, the first plurality of microteeth configured to rub along the surface of the electronic device and remove foreign objects and debris from the surface of the electronic device as it is inserted into the case and moved relative to the first flap.

2. The case of claim 1, wherein the cover further defines an interior space into which the electronic device is received when it is inserted through the opening.

3. The case of claim 1, wherein the first panel and the second panel are coupled together along fewer than all edges to define the opening.

4. The case of claim 1, further comprising:
a second flap secured to an interior surface of the cover and extending along the second side of the opening from a point proximate the first end of the opening to a point proximate the second end of the opening, the second flap having a first side secured to the interior surface of the second panel of the cover and a second side extending away from the second panel of the cover, toward a center of the opening, and toward the first panel and the first side of the opening, the second end of the second flap configured to wipe one of the front surface and the back surface of the electronic device;
a second plurality of microteeth disposed on the second flap, the second plurality of microteeth configured to rub along the surface of the electronic device and remove foreign objects from the surface of the electronic device as it is inserted into the case and moved relative to the second flap.

5. The case of claim 4, wherein the first and second flaps are curved, each flap forming an arc, wherein the first sides of the flaps are secured to the interior of the cover and the first side of the first flap is oriented to be aligned in parallel to a first plane, the first side of the second flap aligned in parallel to a second plane, and wherein the second sides of the flaps are configured to be oriented in parallel to a third plane that is parallel to the surfaces of the electronic device to be wiped by the flaps, such that the second sides of the flaps rub along the surface of the electronic device and remove foreign materials.

6. The case of claim 5, wherein the first and second flaps are biased together to provide even pressure against the surface of the electronic device and the second ends of the flaps are in abutment with one another prior to insertion of an electronic device into the opening.

7. The case of claim 6, wherein the second sides of the flaps curve downward in a direction inward relative to the opening such that an upper surface of the first flap at the second end and an upper surface of the second flap at the second end are disposed abutment with one another prior to insertion of an electronic device into the opening.

8. The case of claim 7, wherein the first and second flaps further comprise one or more securement portions configures to prevent the second ends of the flaps from being pulled out through the opening and thereby reverse direction.

9. The case of claim 8, wherein the one or more securement portions couple the second sides of the flaps to an interior surface of the case.

10. The case of claim 9, wherein a first securement portion couples the second side of the first flap to an interior surface of the first panel and a second securement portion couples the second side of the second flap to an interior surface of the second panel.

11. The case of claim 7, wherein the first plurality of microteeth are disposed on the upper surface of the first flap proximate the second side of the first flap and the second plurality of microteeth are disposed on the upper surface of the second flap proximate the second side of the second flap, wherein the first and second plurality of teeth are positioned in abutment to one another prior to insertion of an electronic device into the opening.

12. The case of claim 4, wherein the first plurality of microteeth are disposed on an upper surface of the first flap and the second plurality of microteeth are disposed on an upper surface of the second flap.

13. The case of claim 4, wherein the first plurality of microteeth are disposed on a lower surface of the first flap second plurality of microteeth are disposed on a lower surface of the second flap.

14. The case of claim 4, wherein the first and second flaps are formed of rubber.

15. A case for an electronic device comprising:
a cover that defines an interior space configured to enclose the electronic device and an opening through which the electronic device can be inserted into the interior space, wherein the opening is elongate to accommodate a width or length of the electronic device and narrow to accommodate conform to and a thickness of the electronic device; and
a cleaning component positioned inside the cover proximate the opening of the cover, the cleaning component comprising a plurality of wipers, each of the plurality of wipers formed of different material and configured to remove a unique foreign material from a surface of an electronic device as it is inserted into or removed from the case, each of the plurality of wipers configured to engage a surface of the electronic device and wipe the surface as the electronic device is inserted into the case through the opening.

16. The case of claim 15, wherein a first wiper is formed a first material and is configured to scrub primarily a first type of foreign material from a surface of the electronic device, a second wiper is formed of a second material and is configured to scrub primarily a second type of foreign material from a surface of the electronic device.

17. The case of claim 16, wherein a third wiper is formed a third material and is configured to scrub primarily a third type of foreign material from a surface of the electronic device.

18. The case of claim 17, wherein the first wiper is formed of leather, the second wiper is formed of rubber, and the third wiper is formed of foam.

19. The case of claim 15, wherein one or more of the plurality of wipers is configured to dispense a liquid solution to enhance scrubbing of the surface of the electronic device.

20. The case of claim 19, further comprising a trigger mechanism configured to effectuate dispensing a liquid cleaning solution in response to manipulation of the trigger mechanism.

21. A case for an electronic device comprising:
a cover having a first panel, a second panel, and a joining component configured to form a sleeve to receive the electronic device, the joining component including a biasing action configured to bias the first panel and the second panel toward each other as the electronic device is being inserted between the first panel and second panel and thereby create a constant pressure against the electronic device as it is inserted into or removed from the case; and
a cleaning component positioned inside the cover, the cleaning component comprising a plurality of ribs protruding from an inner surface of at least one of the first panel and the second panel, the ribs disposed at intervals between a top of the case near an opening of the sleeve and a bottom of the case at the bottom of the sleeve, wherein the ribs are formed of a material and configured to engage a surface of the electronic device to remove foreign material from a surface of an electronic device as it is inserted into or removed from the case.

22. The case of claim 21, wherein the biasing action of the joining component enhances friction between the plurality of ribs and the surface of the electronic device to improve scrubbing of the surface of the electronic device by the ribs and to secure the electronic device from inadvertently sliding out of the case once the electronic device is inserted into the case.

* * * * *